United States Patent
Hennings-Kampa (10) Patent No.: US 8,059,491 B1
(45) Date of Patent: Nov. 15, 2011

(54) RESCUE-FACILITATING COMMUNICATING WRIST WATCH

(76) Inventor: Laura Hennings-Kampa, Northport, NY (US)

( * ) Notice: Subject to any disclaimer, the term of this patent is extended or adjusted under 35 U.S.C. 154(b) by 0 days.

(21) Appl. No.: 12/819,317

(22) Filed: Jun. 21, 2010

Related U.S. Application Data (60) Provisional application No. 61/220,812, filed on Jun. 26, 2009.

(51) Int. Cl.
*G04B 47/00* (2006.01)
*G04B 37/00* (2006.01)

(52) U.S. Cl. .......................................... 368/14; 368/282

(58) Field of Classification Search .............. 368/10–14, 368/282
See application file for complete search history.

(56) References Cited

U.S. PATENT DOCUMENTS

| | | | |
|---|---|---|---|
| 4,737,758 A * | 4/1988 | Meiksin et al. ............ 340/932.2 |
| 4,847,818 A * | 7/1989 | Olsen ............................... 368/10 |
| 5,008,864 A * | 4/1991 | Yoshitake ........................ 368/10 |
| 5,020,039 A * | 5/1991 | Yokote ........................... 368/282 |
| 5,285,430 A * | 2/1994 | Decker .......................... 368/281 |
| 5,444,673 A * | 8/1995 | Mathurin ......................... 368/63 |
| 6,158,884 A * | 12/2000 | Lebby et al. .................. 368/282 |
| 6,272,075 B1 * | 8/2001 | Paganelli et al. ............... 368/10 |
| 6,590,835 B2 * | 7/2003 | Farine et al. .................... 368/10 |
| 6,788,621 B2 * | 9/2004 | Meylan et al. .................. 368/10 |
| 6,854,978 B2 * | 2/2005 | Noirjean ......................... 439/37 |
| 7,136,326 B1 * | 11/2006 | Smith ........................... 368/223 |
| 7,251,197 B2 * | 7/2007 | Yoshida et al. ................. 368/10 |
| 7,800,982 B2 * | 9/2010 | Marhic et al. ................... 368/10 |
| 2004/0057340 A1 * | 3/2004 | Charles-Erickson et al. .. 368/10 |
| 2004/0264301 A1 * | 12/2004 | Howard et al. ................. 368/28 |
| 2007/0070818 A1 * | 3/2007 | Inomata et al. ................. 368/10 |
| 2009/0180355 A1 * | 7/2009 | Cartwright ...................... 368/12 |
| 2009/0231960 A1 * | 9/2009 | Hutcheson ...................... 368/10 |
| 2010/0295684 A1 * | 11/2010 | Hsieh et al. ................. 340/573.1 |
| 2011/0004651 A1 * | 1/2011 | Tuli ............................... 709/203 |
| 2011/0191515 A1 * | 8/2011 | Luk ............................... 710/303 |

* cited by examiner

*Primary Examiner* — Sean Kayes
(74) *Attorney, Agent, or Firm* — Pryor Cashman LLP; Andrew S. Langsam

(57) ABSTRACT

A rescue-facilitating, preferably water resistant communicating wrist watch. A housing is attachable to a user's wrist by a wristband with a microprocessor is disposed therein. A display is provided in communication with the microprocessor and has at least one visible data field. A communication module for transmitting at least one message is provided and connected to the microprocessor and has at least one antenna and a transceiver. A user-activated interface allows the user to select at least one message for transmission, preferably an emergency call for help on at least one preselected frequency. The interface preferably allows the user to control the display and the data displayed thereon. The watch may include a memory module in communication with the microprocessor, adapted to store a plurality of pre-recorded messages for selection of one or more and transmission by the communication module upon selection via the user-activated interface.

11 Claims, 6 Drawing Sheets

RESCUE-FACILITATING COMMUNICATING WRIST WATCH

RELATED APPLICATIONS

Domestic priority is claimed from U.S. Provisional Patent Application No. 61/220,812 entitled "Waterproof Electronic Texting Wrist Watch," filed Jun. 26, 2009, the entirety of which is incorporated by reference herein.

BACKGROUND OF THE INVENTION

1. Field of the Invention

The invention relates to communication devices and more specifically to communication devices capable of sending and receiving text messages and the like.

Specifically, the invention is a water-proof electronic watch that is capable of sending and receiving text messages via wireless telephony technology and also provides emergency location assistance via Global Positioning System (GPS) technology.

2. Description of Related Art

People have come to rely on personal communication devices and personal data assistants (PDAs) for communication and for obtaining information while on the go. Many people carry a mobile/cellular telephone or PDA that not only makes and receives calls but also can send and receive text messages, download information from the internet, and the like. Many of these devices have built-in GPS locating devices, useful both for enabling police or rescue personnel to locate the user in an emergency and for enabling the user to find herself on a map and obtain directions to another location. There are water-proof cell phones and GPS devices that are available in the marketplace; however, these are too large and cumbersome for active sports enthusiasts and outdoorsmen, such as surfers, fishermen, skiers, sailors, kayakers, hikers, and hunters. There is a long-felt need to provide a device that a surfer or other outdoorsman can wear like a watch but that also provides wireless communication and GPS positioning.

SUMMARY OF THE INVENTION

The invention is a waterproof wrist watch with texting and other capabilities. The invention includes existing technology that is currently used in wireless devices, e.g., cellular phones and PDAs such as "Blackberries" made by Research In Motion, Ltd. of Waterloo, Ontario, Canada, water-proof/diving watches, and GPS locators. The watch has a simplified design with a minimum of buttons but maximum functionality. The watch includes the following components:

1. a small microprocessor that provides the typical texting functions plus GPS locating;
2. waterproof buttons located on the surface and/or the side of the watch; each of which may preferably have multiple functions; i.e. mode/menu, select, adjust/edit, left/right/up/down, etc.
3. a shock resistant casing and a low glare screen.

In one embodiment, the keyboard appears on a screen menu that is operated by a minimum number of waterproof buttons on the surface of the watch face.

The invention is well-suited for the needs of active water sports enthusiasts and outdoorsmen, such as surfers, fishermen, skiers, sailors, kayakers, hikers, and hunters. Surfers may need to communicate with someone on the beach or have access to tidal information and wave forecasts. Snow skiers and boarders usually want to arrange for a meeting place on the mountain. In an emergency, the watch acts as a locating beacon for rescue personnel, preferably via activation of a one-touch emergency button.

The invention is a communication device, an emergency beacon, and a time piece all in one.

DETAILED DESCRIPTION OF THE INVENTION AND DRAWINGS

Figure 5:
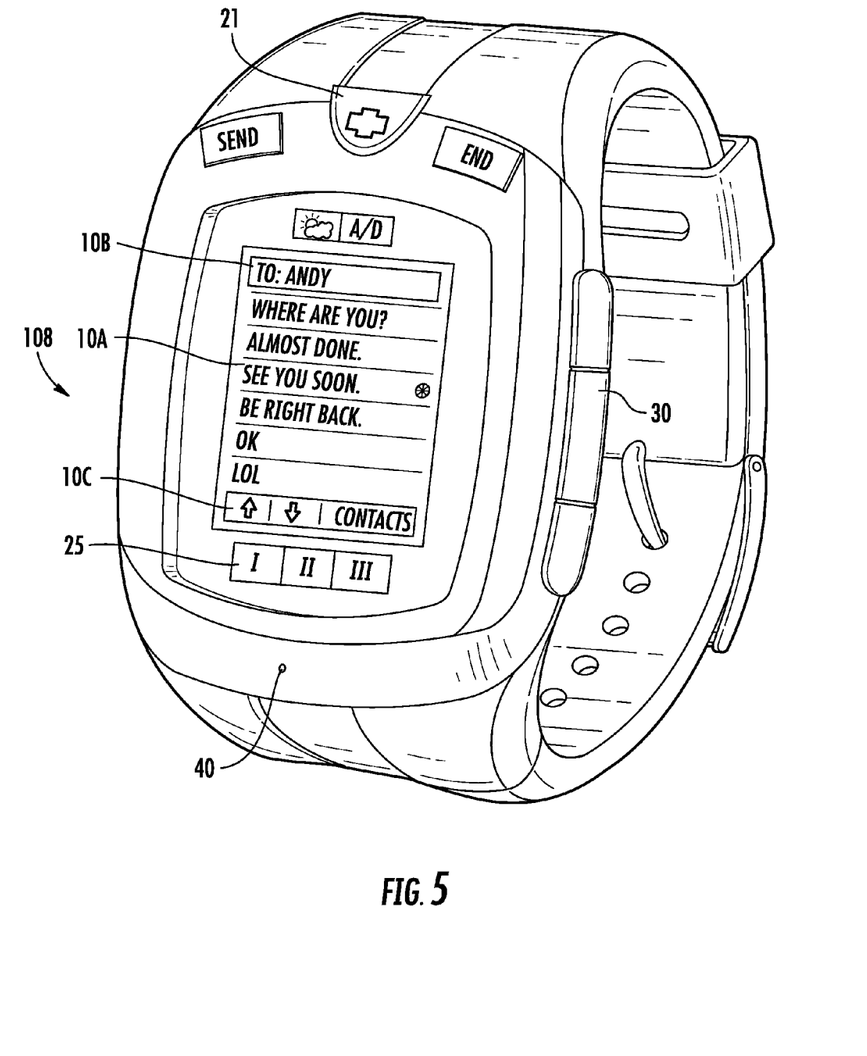
FIG. 5 is a perspective view of a modified texting sport watch in accordance with the invention in a pre-recorded texting mode.
Figure 6:
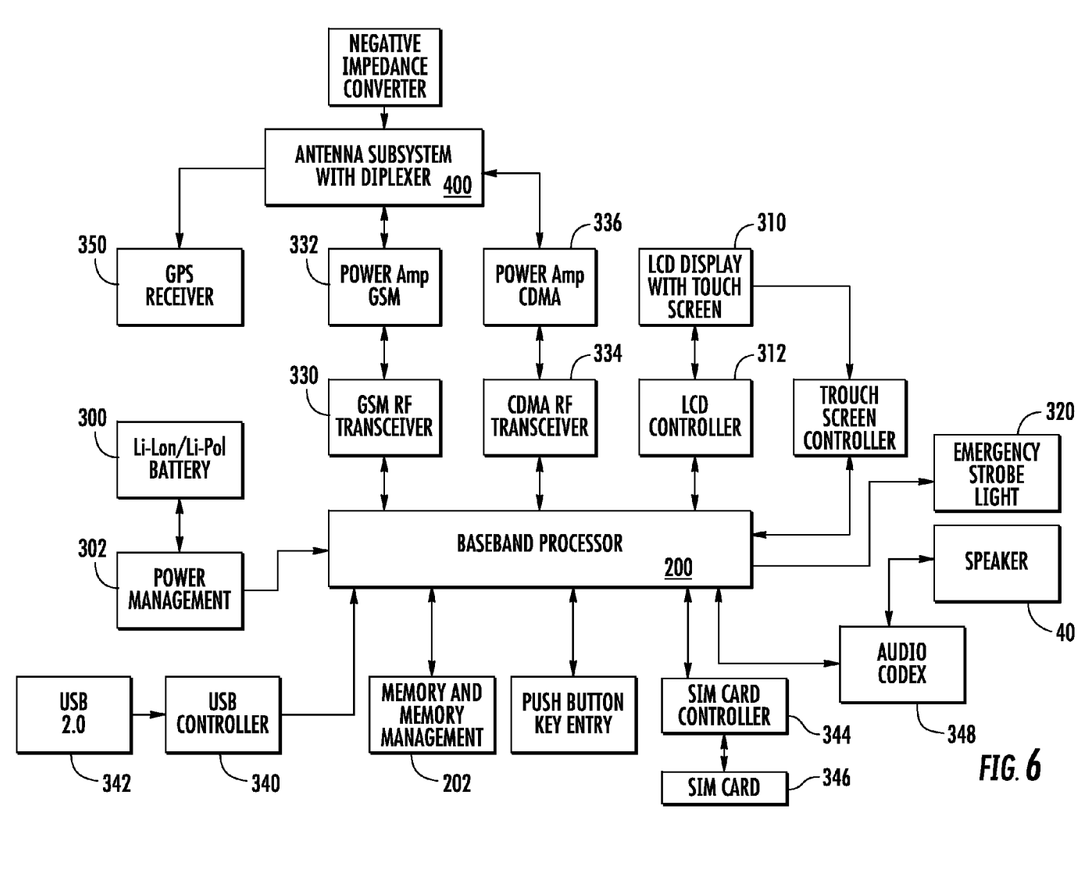
FIG. 6 is a block diagram depicting the various subsystems and components of a texting sport watch in accordance with the invention.

Description of the invention will now be given with reference to FIGS. 1-6. One embodiment of the invention is shown in FIGS. 1-4, and a second modified embodiment is shown in FIG. 5. FIG. 6 depicts the subsystems and components that enable the functionality of either embodiment. It should be understood that these figures are exemplary in nature and in no way serve to limit the scope of the invention, which is defined by the claims appearing hereinbelow.

Figure 1:
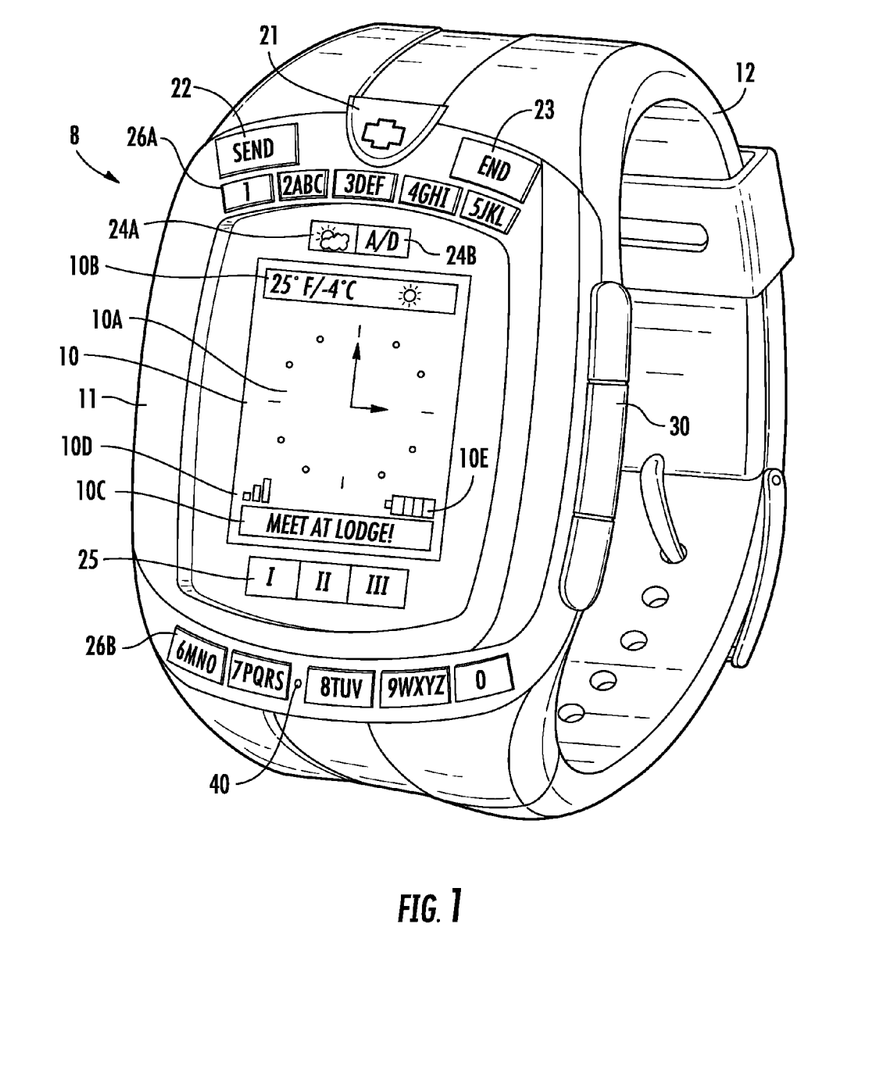
FIG. 1 is a perspective view of a texting sport watch in accordance with the invention in an analogue time mode displaying representative weather conditions.
Figure 2:
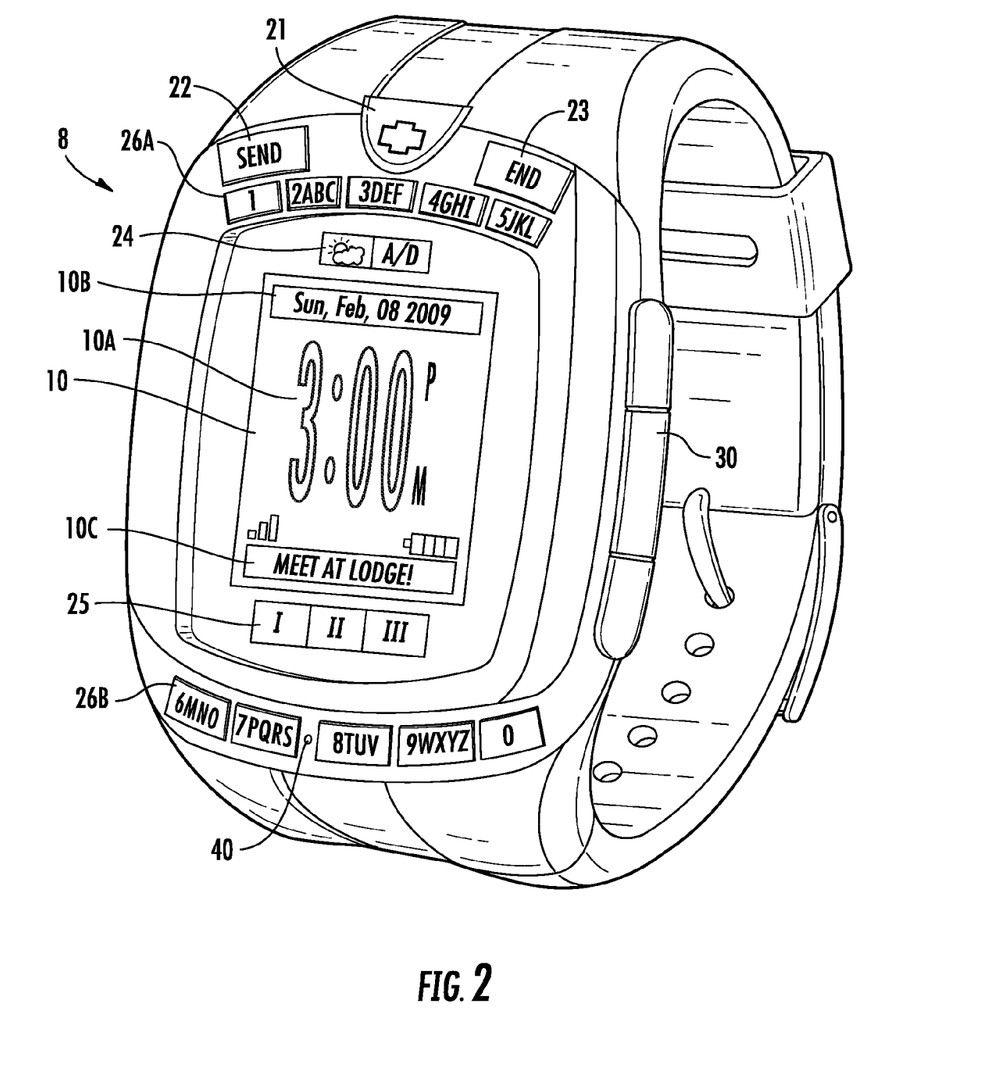
FIG. 2 is a perspective view of a texting sport watch in accordance with the invention in a digital-mode displaying the representative date.

Watch 8 of FIGS. 1-4 includes a display 10 set in a housing 11 (preferably of a plastic or non-metallic material so as not to impact on any embedded antenna to be described below), which is attachable to a person's wrist via band 12, as with most watches. Display 10 may include a single section or multiple sections; as shown in FIGS. 1-2, display 10 includes a main section 10A and two data fields 10B and 10C, to be described below. A signal strength indicator 10D and a battery level indicator 10E may also be provided, as is standard on the display screen of conventional cell phones.

Several buttons or sets of buttons 21-26B are provided around the watch, serving different functions. Button 21 is an emergency button; when pressed, watch 8 emits a distress signal on one or more relevant frequencies and/or addressed to one or more relevant rescue providers (e.g., lifeguard, ski patrol, 911, etc.). The function of button 21 is not designed to be changeable or programmable, as it is essential that assistance be readily obtainable by the outdoor sport enthusiast. However, while the function may not be alterable, the one or more contacts to which the distress signal is sent may be programmable so that the wearer can reach the most relevant people the quickest (e.g., when surfing at beach A, the user can program the number of lifeguard A as the emergency contact for button 21, and when surfing at beach B, the user can program the number of lifeguard B as the emergency contact). Alternatively or in addition, a generic distress signal can be sent over emergency channels which would automatically be received by the nearest or most appropriate responders. Optionally, button 21 may be partially recessed to prevent accidental depression during the non-emergent portions of the wearer's activities.

Buttons 22 and 23 are typical texting/communication buttons such as SEND and END and operate substantially in the conventional manner. These buttons, like button 21, are also preferably dedicated, single-function buttons.

Buttons 24A-B are function buttons that affect the nature of display 10. For example, button 24A includes a depiction of a sun and a cloud; when pressed, watch 8 receives weather information that is preferably displayed in data display field 10B. Optionally, immediately after button 24A is pressed, weather information is displayed in a large format in main display area 10A, and then after a short period of time (e.g., 5 seconds), the weather data appears only in field 10B. When button 24A is pressed a second time, to deactivate the weather function, other data, may appear in data field 10B. As shown in FIG. 2, the day and date may appear in data display field 10B. Optionally, watch 8 can be adapted to receive emergency weather information, such as an incoming storm, regardless of whether the weather mode is activated. Depressible button 24B is labelled A/D, standing for analogue/digital. Selectively depressing this button changes the nature of the time display shown in main section 10A. As shown in FIG. 1, the time is displayed in an analogue manner (the hands and face of the "clock" are preferably virtual, appearing from the activation of LEDs or an LCD screen). When the A/D button 24B is depressed, the mode of the time display switches from the analogue mode of FIG. 1 to the digital mode shown of FIG. 2.

Figure 3:
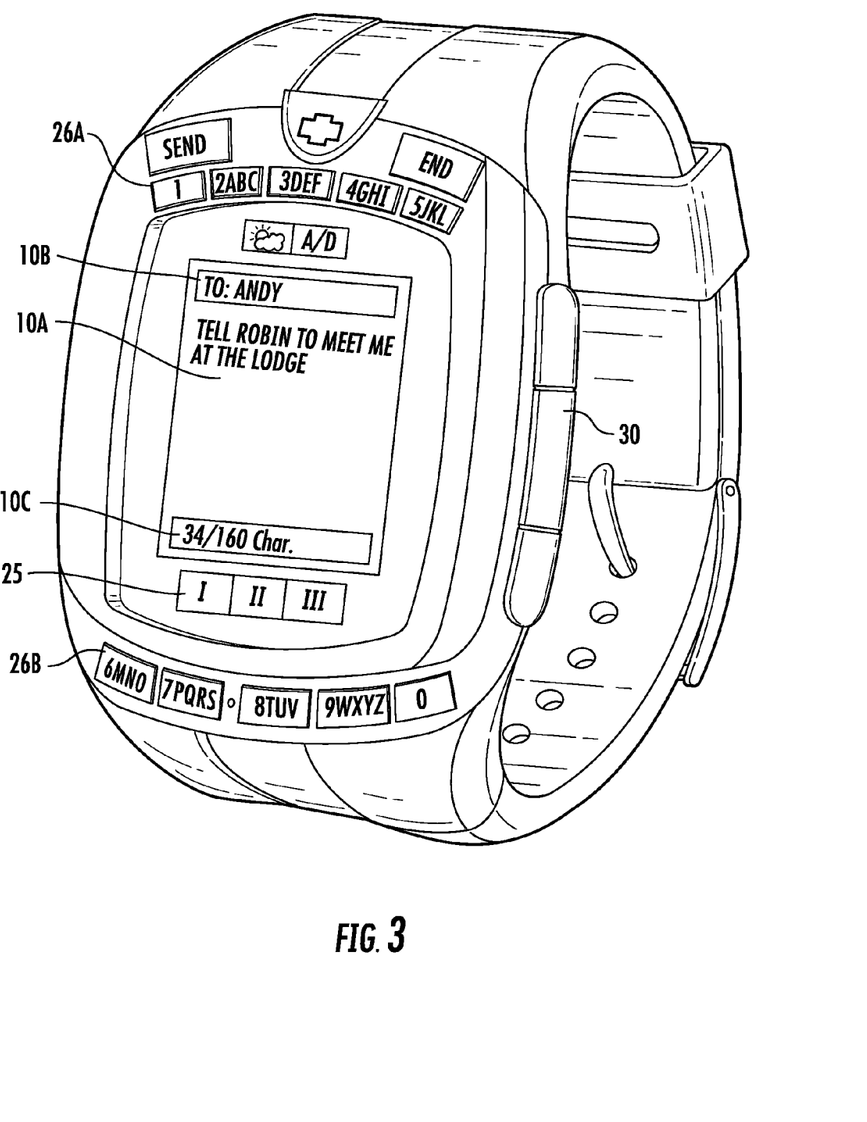
FIG. 3 is a perspective view of a texting sport watch in accordance with the invention in a free form texting mode.

Buttons 25 are provided to change the overall mode of operation of watch 8. Alternating or in addition, aspects of the invention contemplate that display screen 10A be touch sensitive. The function of these buttons may vary depending on the mode selected. In one embodiment of the invention, depression of button 25(I) puts the watch into its default time mode as shown in FIGS. 1 and 2. In this mode, for example, data display field 10B can be changed from displaying weather or day/date via operation of button 24A. Data field 10C can display received text messages (or voice converted into text) from another party. Depression of button 25(II) may place the watch into a free-form text mode, as shown in FIG. 3. Here, main data field 10A shows the text being input by the user and/or the full text of a received message. Text may be input via alphanumeric buttons 26A-B. In an exemplary configuration, alphanumeric button set 26A includes the numbers 1-5 and letters A-L, while set 26B includes the numbers 6-0 and letters M-Z. Multiple depressing of the relevant button will cause the display to iterate to the desired letter or number, in a conventional manner. Data field 10B may indicate to whom the message is to be sent or from whom the message was received. Data field 10C may indicate how many characters the message has used up out of a possible maximum. Other options are possible for the nature of the data shown in fields 10A-C.

Figure 4:
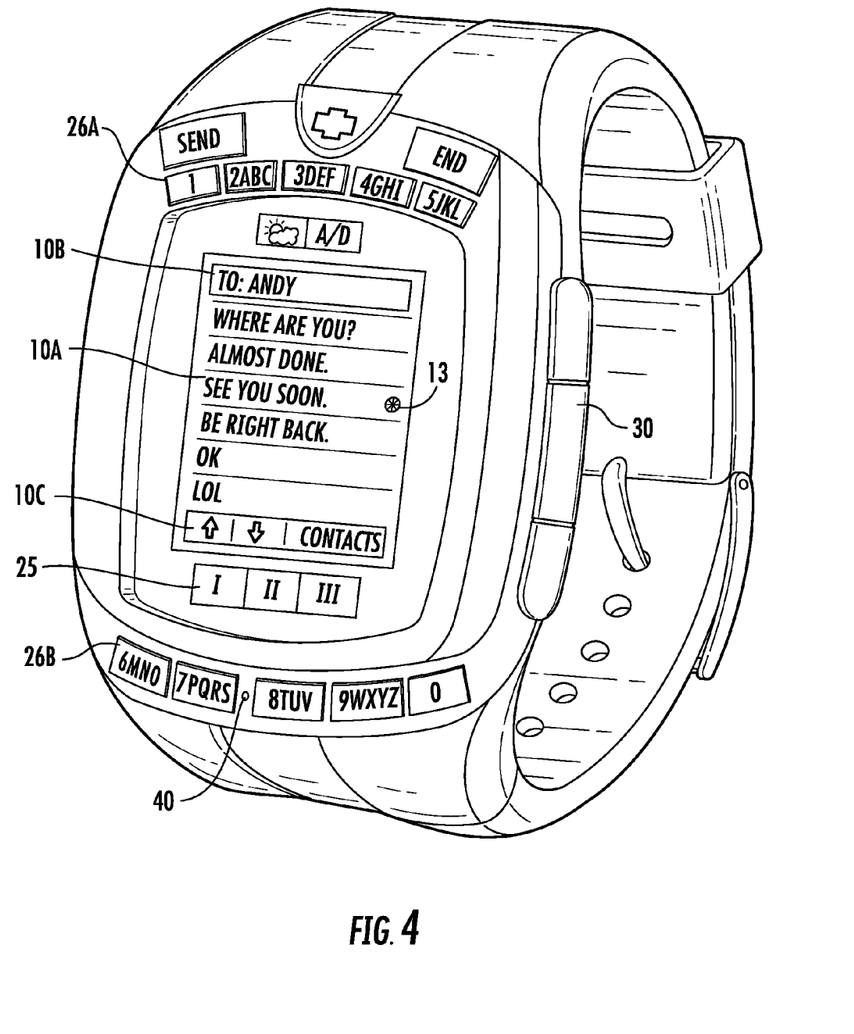
FIG. 4 is a perspective view of a texting sport watch in accordance with the invention in a pre-recorded texting mode.

Pressing button 25(II) (or, alternatively, by pressing button 25(II) twice, thereby allowing button 25(III) to have different functionality) may optionally enable the pre-recorded text mode shown in FIG. 4. Here, display 10A lists a number of pre-recorded messages from which the user may select. Data field 10B still shows the recipient of the message, however data field 10C now depicts the revised functions of buttons 25(I)-(III). For example, button 25(I) scrolls cursor 13 up, button 25(II) scrolls cursor 13 down, and button 25(III) brings up a contact list. Other functions may be provided.

FIG. 5 depicts a modified version of the watch as watch 108. Like elements are provided with like reference numerals, and description will not be repeated. The chief difference is that watch 108 does not have alphanumeric buttons 26. In this embodiment, it is preferred to utilize pre-recorded text messages, similar to that shown in FIGS. 4-5.

In either embodiment, it is preferable for the watch 8/108 to include side buttons 30. Side buttons 30 may be programmed to be redundant to buttons 25 but accessible from the side of the watch. This feature may be relevant for skiers, divers, hunters, or the like who may be wearing gear or protective clothing that partially or completely obstructs or hampers access to buttons 25 (e.g., a ski jacket sleeve, a glove, etc.). Buttons 30 are shown on the right side of watch 8/108, however they may also be provided on the left side in addition or in the alternative. It is also preferable to provide a speaker 40 and/or an adjacent microphone on the watch for various sound functions. For example, it may be preferable to have text messages read/spoken to the wearer (e.g., if she is visually impaired or very actively engaged in her activity and not able to divert her attention to the face of her watch safely). Also, when receiving weather alerts or warnings, an alarm sound may be generated to alert the wearer of the incoming information. Similarly, a sound may be generated when a text message is received. As another option, when the user activates the emergency function by pressing button 21, watch 8/108 may beep loudly from speaker 40 to provide a sonic beacon to help rescue workers locate the wearer or may be provided with an emergency strobe light 320 (see FIG. 6) to assist in night time or water rescue.

FIG. 6 is a block diagram of the components and subsystems that are utilized to implement the invention's functionality previously described above. The various blocks that are described utilize conventional off-the-shelf components that are manufactured by multiple sources and are not necessarily custom components.

The heart of watch 8/108, like in any complex computer system, is baseband processor 200. The memory and memory management block 202 will contain the operating system, application program, as well as temporary storage for the various I/O devices connected to the base band processor 200. Baseband processor 200 receives and controls all of the various input/output (I/O) interfaces that are connected to it. It receives commands from the touch screen, pad buttons, as well as the various device I/O inputs connected to it, such as GSM RF transceiver 330 and its GSM power amp 332, CDMA RF transceiver 334 and its CDMA power amp 336, USB controller 340 and whatever device may be attached via USB port 342, SIM card controller 344 and its corresponding SIM card 346, speaker 40 and audio codex 348, and the like.

Battery and Power Management Block

The battery that will be used is preferably a single cell LiI-Ion/Li-Pol battery 300, although other technology may be utilized as well. Power management block 302 controls many operations that are performed while watch 8/108 is powered on.

Once power has been applied to watch 8/108, the power management block 302 controls the charge management of battery 300 with thermal fold back, dynamic power management, and temperature sensing. It contains up to nine low drop out (LDO) regulators (not shown) some of which are adjustable and some are fixed. This is to provide the designer with flexibility since other components in the design may require different voltages. An important issue in any device that uses batteries for a power source is how long will the batteries last before having to be charged. To minimize power consumption it is desired to have as little voltage as necessary across the pass element in a regulator to reduce its power consumption. These are controlled by the baseband processor so if a particular function is not in use, the power will be turned off to that I/O device to conserve battery power. Other important features of the power management block is to provide a path to charge the batteries as well as control the power to other devices in the design.

The power management block 302 also controls power sent to LCD touch screen 310, LCD controller 312, a backlight, the emergency strobe light, and contains an A/D converter (not shown) that will sample various system parameters. It provides an output showing the condition of the battery (e.g., battery level indicator 10E of FIGS. 1-2) as well as the signal strength of received signals over the RF links (e.g., signal strength indicator 10D of FIGS. 1-2). These are indicated on the LCD display when that item is selected on the menu, or they are continuously displayed as with many conventional communication devices or displayed if their signal/power falls below a predetermined minimum value. The menu is accessed by pressing the menu key or by utilizing the touch screen, or by any of the various buttons described above in connection with FIGS. 1-5.

Power management chip sets are manufactured by many vendors. Examples of such manufacturers are Qualcomm and Texas Instruments, and one specific chip set suitable for the invention is Texas Instrument part number TPS65800.

GPS Receiver Block

The GPS receiver 350 provides very important functionality. First, it provides a very accurate position expressed in latitude and longitude of where watch 8/108 (and, by extension, its wearer) is located. In an emergency, this position is transmitted using the phone capability of watch 8/108. Using a canned message that is activated by the touch screen or one of the pad buttons (e.g., button 21 of FIGS. 1-5), the phone automatically calls a remote emergency number using 911 or other preset or pre-programmed emergency number. When the message is received, the latitude and the longitude are displayed as a position on a map, and the exact coordinates of the person wearing the watch are instantly determined. Rescue can be dispatched immediately. There are many mapping programs that are readily available such as Google Earth by Google Inc. of Mountain View, Calif.; XMap by Delorme of Yarmouth, Me.; and the like. Systems such as these receive as an input the latitude and longitude and then show this location on a detailed map in a user-friendly position.

The next function that the GPS receiver provides is an accurate update for the time that watch 8/108 displays. Initially the time is set from the set-up menu. Hours, minutes, AM/PM, DST are selected, and the time is entered. The clock utilized by the baseband processor 200 continually updates this time. However, as with any desktop or laptop CPU, the time will drift after a while. Watch 8/108 utilizes the time information transmitted from the satellites to GPS receiver 350 incorporated in watch 8/108 to update and correct the clock information when it is enabled. Even if the GPS functionality is not required, and the GPS is put in "sleep mode," baseband processor 200 will wake it up momentarily to get a real time update and then put it back into sleep mode. This is to conserve battery power.

Another function that the GPS is used for is to determine a distance and position from its location to one that is input from watch 8/108. When the user wants to get from his/her instant location to another location, GPS receiver 350 is readily adapted to determine an appropriate route. Much or all of the requisite calculation for making this determination can be accomplished over the Internet, thereby minimizing the amount of computing power required in watch 8/108. It will display the results, i.e., the route to take and the time expected for the travel.

The GPS functionality is included in watch 8/108 by incorporating a device that is available from multiple sources. It either can be integrated into base band processor 200 or from multiple sources that produce these GPS platform IC's, such as the A2100-A/B receiver produced by Vincotech of Unterhaching, Germany.

A major challenge with all of the RF devices that are packaged in the watch 8/108 product is antenna 400. Owing to the necessarily small footprint of the watch, antenna 400 must also be small. Small antennae have extremely low input impedance, and if ideally matched to a typical load of 50 ohms, would require negative impedance. One embodiment of the invention includes a negative impedance converter to overcome this problem. In addition or in the alternative, antenna 400 may be incorporated into watchband 12. This allows the antenna size to be comparable with a wavelength.

The invention is not limited to the above description. For example, while the display is shown as being changeable by analogue buttons around the periphery of the display and/or on the side of the housing, the display may include a touch screen with virtual buttons displayed thereon in a known manner as described in connection with FIG. 6. Also, while the above description includes weather and analogue/digital functions, other functions may be provided.

Having described certain embodiments of the invention, it should be understood that the invention is not limited to the above description or the attached exemplary drawings. Rather, the scope of the invention is defined by the claims appearing hereinbelow and any equivalents thereof as would be appreciated by one of ordinary skill in the art.

What is claimed is:

1. A rescue-facilitating emergent and non-emergent communicating wrist watch, comprising:
   a waterproof and shock-resistant, timer housing and a wristband secured thereto for facilitating attachment to a user's wrist via said wristband;
   a microprocessor disposed in said timer housing and being connected to a GPS location-sensing mechanism, said microprocessor also having stored therein at least one prerecorded emergent and non-emergent message;
   a time and other data display, disposed in but visible external to said housing, in communication with said microprocessor, and having at least two data display fields to selectively and simultaneously display the time of day and at least one other item of data; the item of data is user selectable from the group consisting of: current weather conditions; future weather conditions; temperature; one or more of said prerecorded, emergent and/or non-emergent messages; newly composed and/or received messages; battery strength; and signal strength;
   a two-directional, communication module, connected to said microprocessor and connected to an antenna, said antenna being substantially disposed within said wristband;
   said wrist watch also comprising a dedicated emergency activation mechanism for selectively transmitting through said antenna said GPS location and, if stored, said pre-recorded emergent message, to a remote receiver via said communication module;
   at least one transceiver, adapted to transmit said GPS location and at least one of said emergent or non-emergent messages; and
   a user-activated interface mechanically separate from said dedicated emergency activation mechanism and adapted to allow the user to select and transmit or receive through said antenna, at least one prerecorded non-emergent message from said microprocessor, if stored, and/or newly composed or received messages.

2. A communicating wrist watch according to claim 1, wherein said at least one prerecorded emergent message is an emergency text or audible call for help transmitted to and on at least one preselected and emergency-based electromagnetic frequency.

3. A communicating wrist watch according to claim 1, wherein said user-activated interface is further adapted to allow the user to control said display and select additional items of data to be displayed on said time and other data display.

4. A communicating wrist watch according to claim 1, further comprising a memory module in communication with said microprocessor, adapted to store a plurality of pre-recorded non-emergent messages for selective transmission by said communication module upon selection by the user via said user-activated interface.

5. A communicating wrist watch according to claim 1, wherein said wrist watch further comprises a night-visible light mechanism also activated upon activation of said dedicated emergency activation mechanism.

6. A communicating wrist watch according to claim 1, wherein said communication module is adapted to receive incoming messages, and said microprocessor causes said incoming messages to be displayed on said time and other data display.

7. A communicating wrist watch according to claim 1 wherein said housing is non-metallic.

8. A communicating wrist watch according to claim 1 wherein the wrist watch emits an alarm when the transceiver receives a signal from a remote location indicative of a change of weather conditions.

9. A communicating wrist watch according to claim 1 wherein one or more components connected to the microprocessor are selectively blocked from consuming power.

10. A communicating wrist watch according to claim 1 wherein said dedicated emergency activation mechanism is partially recessed on said housing.

11. A communicating wrist watch according to claim 1 wherein said antenna is connected to a negative impedence converter.

* * * * *